(12) United States Patent
Marchini et al.

(10) Patent No.: US 9,387,639 B2
(45) Date of Patent: Jul. 12, 2016

(54) METHOD OF AND APPARATUS FOR BUILDING A SEQUENCE OF TYRES DIFFERENT FROM EACH OTHER

(75) Inventors: Maurizio Marchini, Milan (IT); Christian De Col, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 485 days.

(21) Appl. No.: 13/878,645

(22) PCT Filed: Oct. 26, 2011

(86) PCT No.: PCT/IB2011/054779
§ 371 (c)(1),
(2), (4) Date: Apr. 10, 2013

(87) PCT Pub. No.: WO2012/056409
PCT Pub. Date: May 3, 2012

(65) Prior Publication Data
US 2013/0214444 A1    Aug. 22, 2013

Related U.S. Application Data

(60) Provisional application No. 61/411,724, filed on Nov. 9, 2010.

(30) Foreign Application Priority Data

Oct. 29, 2010  (IT) ............................... MI2010A2021

(51) Int. Cl.
*B29D 30/24* (2006.01)
*B29D 30/26* (2006.01)

(52) U.S. Cl.
CPC .............. *B29D 30/24* (2013.01); *B29D 30/246* (2013.01); *B29D 30/26* (2013.01)

(58) Field of Classification Search
USPC ........................................................ 264/39
See application file for complete search history.

(56) References Cited

U.S. PATENT DOCUMENTS

| 6,004,250 A | 12/1999 | Byerley |
| 2004/0011470 A1 | 1/2004 | Ravat |
| 2010/0116414 A1 | 5/2010 | Marchini et al. |

FOREIGN PATENT DOCUMENTS

| CN | 1394165 A | 1/2003 |
| CN | 101372155 A | 2/2009 |

(Continued)

OTHER PUBLICATIONS

Notification of the First Office Action issued Jan. 27, 2015 by the State Intellectual Property Office of the People's Republic of China in corresponding Application No. CN 201180049625.1 (6 pages).

(Continued)

*Primary Examiner* — Jacob Thomas Minskey
(74) *Attorney, Agent, or Firm* — Finnegan, Henderson, Farabow, Garrett & Dunner, L.L.P.

(57) ABSTRACT

A method of building a sequence of tires different from each other, includes generating a first deposition surface by a first series of consecutive circumferential sectors. The first deposition surface is selected as a function of the type of a first tire to be built. Each circumferential sector of the first series is removably coupled to a central body of a forming drum. The method further includes manufacturing at least one component of the at least one first tire by deposition of the at least one component at a radially external position to the first deposition surface of the forming drum, removing the at least one component from the forming drum and replacing each circumferential sector of the first series with a circumferential sector of a second series for generating a second deposition surface selected as a function of the type of a second tire to be built which is different from the first tire. The replacement includes uncoupling each circumferential sector of the first series from the central body and removably coupling each circumferential sector of the second series to the same central body.

40 Claims, 6 Drawing Sheets

(56) References Cited

FOREIGN PATENT DOCUMENTS

Figure 1:
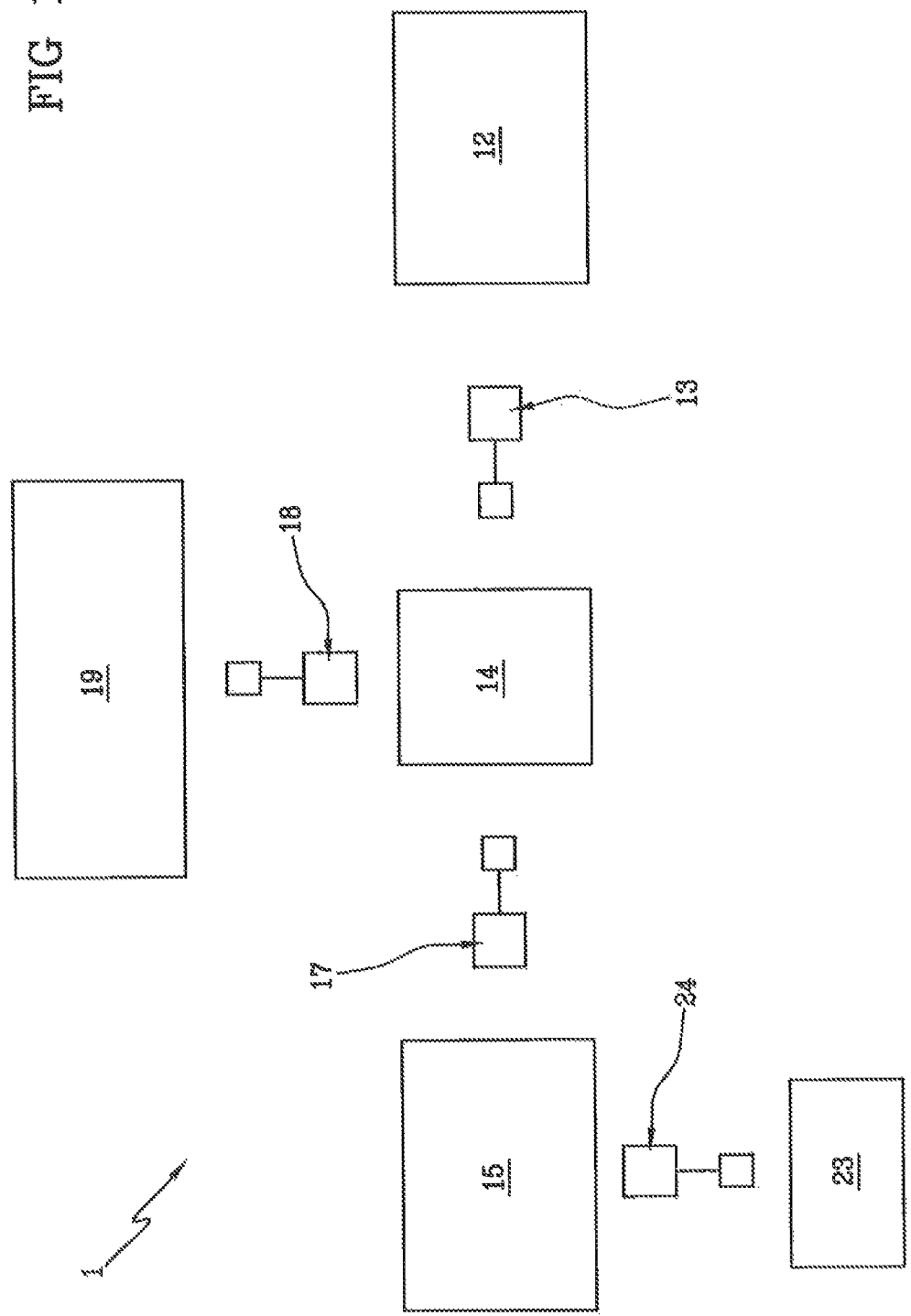

| JP | H7-015328 U | 3/1995 |
| JP | 2007-152574 A | 6/2007 |
| WO | WO 2008/152453 A1 | 12/2008 |
| WO | WO 2009/058296 A1 | 5/2009 |
| WO | WO 2011/064500 A1 | 6/2011 |

OTHER PUBLICATIONS

English-language translation of Notification of the First Office Action issued Jan. 27, 2015 by the State Intellectual Property Office of the People's Republic of China in corresponding Application No. CN 201180049625.1 (5 pages).

International Search Report from the European Patent Office for International Application No. PCT/IB2011/054779, mailing date Feb. 15, 2012.

Written Opinion of the International Searching Authority from the European Patent Office for International Application PCT/IB2011/054779, mailing date Feb. 15, 2012.

Office Action issued from the Japanese Patent Office, in corresponding Application No. 2013-535568, dated Oct. 19, 2015, 7 pages including translation.

Communication, issued from the European Patent Office, in corresponding Application No. 11797349.5-1706, dated Nov. 4, 2015, 6 pages.

METHOD OF AND APPARATUS FOR BUILDING A SEQUENCE OF TYRES DIFFERENT FROM EACH OTHER

CROSS REFERENCE TO RELATED APPLICATIONS

This application is a national phase application based on PCT/IB2011/054779, filed Oct. 26, 2011, which claims the priority of Italian Application No. MI2010A002021, filed Oct. 29, 2010, and the benefit of U.S. Provisional Application No. 61/411,724, filed Nov. 9, 2010, the content of all of which is incorporated herein by reference.

BACKGROUND OF THE INVENTION

1. Field of the Invention

The present invention relates to a method and an apparatus for building a sequence of tyres different from each other.

More particularly, the invention is addressed to the method and equipment used in the field of building a sequence of tyres different from each other, for manufacturing components being part of the tyre in progress of manufacture.

2. Description of the Related Art

A tyre for vehicle wheels generally comprises a carcass structure including at least one carcass ply having respectively opposite end flaps in engagement with respective annular anchoring structures integrated into the regions usually identified as "beads", defining the radially internal circumferential edges of the tyre.

Associated with the carcass structure is a belt structure including one or more belt layers, placed in radially superposed relationship relative to each other and to the carcass ply, having textile or metallic reinforcing cords of crossed orientation and/or substantially parallel to the circumferential extension direction of the tyre. Applied at a radially external position is a tread band also made of elastomeric material like other semimanufactured products constituting the tyre.

Respective sidewalls of elastomeric material are further applied at an axially external position, to the side surfaces of the carcass structure, each extending from one of the side edges of the tread band until close to the respective annular anchoring structure to the beads. In tyres of the "tubeless" type, an airtight coating layer, usually referred to as "liner" covers the inner tyre surfaces.

To the aims of the present specification and the following claims, by "reversible quick fit" it is intended a removable connection that can be quickly activated and deactivated by a restricted number of manually and/or automatically performed actions. Preferably, it is a device selectively operating between an active configuration and a passive configuration, more preferably following the action of moving two elements to be connected close to each other.

To the aims of the present specification and the following claims, by "snap-fit device" it is intended a device that is intrinsically stimulated to take an active configuration in which coupling of two or more components can take place. Preferably, it is a device that is elastically stimulated to take an active configuration and more preferably that is suitable to at least move from a passive configuration to an active configuration following the action of moving two elements to be connected close to each other.

To the aims of the present specification and the following claims, the term "strip-like element" means an elongated manufactured product cut to size, which has a cross-section outline of flattened conformation and comprises one or more cords of textile and/or metallic material extending parallel to the longitudinal extension of the strip-like element itself and embedded in, or at least partly coated with at least one layer of elastomeric material.

To the aims of the present specification and the following claims, the term "component" of a tyre is understood as indicating the assembly of one or more components or any portion or combination of same, adapted to perform a function in the tyre, selected for example from: liner, under-liner, carcass ply/plies, under-belt insert, belt strips both crossed with each other and at zero degrees, attachment skim coat for the tread band, tread band, bead core, bead filler, textile reinforcing inserts made of metal or of elastomeric material alone, abrasion-proof insert, sidewall inserts.

SUMMARY OF THE INVENTION

The Applicant could observe that on a forming drum externally having a substantially cylindrical deposition surface, a plurality of strip-like elements can be applied which are disposed adjacent to each other so as to form at least one first annular reinforcing layer on the forming drum itself, set to a first work diameter in which each of the applied strip-like elements on the deposition surface subtends an arc of a circumference of a width equal to a whole sub-multiple of the overall circumferential extension of the deposition surface itself. Adjusting devices operating on the forming drum can subsequently carry out expansion of the drum to a second work diameter greater that the first work diameter, while maintaining the deposition surface substantially cylindrical. The Applicant has also observed that such a forming drum can comprise consecutive circumferential sectors, radially movable upon command of the adjusting devices. Each of the circumferential sectors can have comb-shaped end portions operatively engaging each in a mating comb-shaped end portion carried by a circumferentially adjacent circumferential sector.

The Applicant has observed that tendentially each tyre size requires a specific forming drum for formation of one or more belt layers or a carcass structure.

While having ascertained the possibility of using the same type of forming drum for two or more tyre sizes, the Applicant has however noticed that a process and an apparatus as above described would require management of some typologies of forming drums for which a specific warehouse is necessary.

The Applicant has perceived the necessity to optimise the management of the forming drums without being obliged to provide a specific warehouse of big sizes for forming drums having shapes and/or sizes different from each other, while ensuring the possibility of selecting the forming drum as a function of the size of the tyre to be made.

The Applicant has found that by providing a plurality of forming drums having a single central body to which it is possible to couple a series of circumferential sectors selected from at least one first and one second series of circumferential sectors depending on the size of the tyre to be manufactured, the warehouse related to the forming drums can be restricted to the only series of circumferential sectors, and the range of forming drums from which it is possible to make a selection can be wider.

More particularly, in accordance with a first aspect, the invention relates to a method of building a sequence of tyres different from each other, comprising:

generating a first deposition surface by a first series of consecutive circumferential sectors, said first deposition surface being selected as a function of the type of a first tyre to be built; each circumferential sector of the first series being removably coupled to a central body of a forming drum;

manufacturing at least one component of said at least one first tyre by deposition of said at least one component at a radially external position to said first deposition surface of the forming drum;

removing said at least one component from the forming drum;

replacing each circumferential sector of the first series with a circumferential sector of a second series for generating a second deposition surface selected as a function of the type of a second tyre to be built which is different from said first tyre;

said replacement comprising uncoupling each circumferential sector of the first series from the central body and removably coupling each circumferential sector of the second series to the same central body.

The Applicant has ascertained that greater production flexibility is thus advantageously obtained as a wide range of series of circumferential sectors and therefore of forming drums is made available, so that it is restricted the room that is not directly intended for production, such as that taken up by a warehouse for the forming drums.

In accordance with a second aspect, the invention relates to an apparatus for building a sequence of tyres different from each other, comprising:

at least one central body of a forming drum, at least one first series of circumferential sectors in which each circumferential sector of said first series is adapted to be removably coupled to said central body so as to generate a first deposition surface;

at least one second series of circumferential sectors in which each circumferential sector of said second series is adapted to be removably coupled to said central body so as to generate a second deposition surface;

said first deposition surface being selected as a function of the type of a first tyre to be built and said second deposition surface being selected as a function of the type of a second tyre to be built which is different from said first tyre.

This apparatus helps in making available a wide range of series of circumferential sectors and therefore of forming drums.

The present invention, in accordance with one of the aforesaid aspects, can have one or more of the preferred features hereinafter described.

In accordance with a possible embodiment, each circumferential sector is removably coupled to said central body by activating at least one reversible quick-fit device.

This enables the time for replacement of the circular sectors to be reduced, thereby being reduced the idle time in the work cycle.

In a possible embodiment, replacement of each circumferential sector of the first series with a circumferential sector of the second series comprises uncoupling each circumferential sector of the first series from the central body by deactivating at least one reversible quick-fit device.

Preferably, replacement of each circumferential sector of the first series with a circumferential sector of the second series comprises uncoupling each circumferential sector of the first series from the central body by deactivating at least one reversible quick-fit device for each circumferential sector. This helps in simplifying and shortening the time of uncoupling the circumferential sectors of the first series on changing of the tyre size.

According to a possible embodiment, replacement of each circumferential sector of the first series with a circumferential sector of the second series comprises coupling each circumferential sector of the second series to the central body by activating said at least one reversible quick-fit device.

According to a further possible embodiment, replacement of each circumferential sector of the first series with a circumferential sector of the second series comprises coupling each circumferential sector of the second series to the central body by activating said at least one reversible quick-fit device for each circumferential sector. In this manner the time required for coupling the circumferential sectors of the second series, on changing of the tyre size, is simplified and shortened.

In a further embodiment, the reversible quick-fit device is a snap-fit device. Use of a snap-fit device helps in simplifying and therefore reducing the time in particular required for coupling the circumferential sectors to the central body. In addition, it helps in making coupling and uncoupling of the circumferential sectors independent of the operating modes adopted by an operator.

Preferably, replacement of each circumferential sector of the first series with a circumferential sector of the second series comprises deactivating and activating the same snap-fit device for each circumferential sector. This helps in optimising the number of components coming into play and therefore to make uniform the actions to be carried out in the replacement step, and the obtained result.

According to a further embodiment, the reversible quick-fit device is activated for coupling a circumferential sector to said central body by relatively moving said circumferential sector close to said central body in a radial direction.

Preferably, the reversible quick-fit device is deactivated for uncoupling a circumferential sector from said central body by relatively moving a release element in a radial direction close to said circumferential sector coupled to said central body. The radial approaching movement helps in restricting the relative stroke between a circumferential sector, the central body and possibly the release element.

In accordance with a possible embodiment, the radial position of the circumferential sectors coupled to the central body is modified before manufacturing at least one component of said at least one first tyre. Thus the position in which the circumferential sectors are coupled is optimised, this position being independent of the position in which said tyre component is manufactured.

In accordance with a further embodiment, modifying the radial position of the circumferential sectors coupled to the central body comprises translating the circumferential sectors from a first diameter in which said first deposition surface is generated, to a second diameter greater than said first diameter. In this way, coupling of the circumferential sectors is simplified by selecting a compact radial position relative to the position in which said tyre component is manufactured.

In accordance with a further embodiment, the radial position of the circumferential sectors coupled to the central body is modified before replacing each circumferential sector of the first series with a circumferential sector of the second series. Thus, the position in which the circumferential sectors are replaced is optimised as it is independent of the position in which said tyre component is manufactured.

According to a possible embodiment, manufacturing said at least one component of said at least one first tyre by deposition of said at least one component at a position radially external to said first deposition surface of the forming drum is carried out in correspondence of said second diameter.

Preferably, modifying the radial position of the circumferential sectors coupled to the central body before replacing each circumferential sector of the first series with a circumferential sector of the second series comprises translating the circumferential sectors from said second diameter to a third diameter smaller than said second diameter. In this way, replacement of the circumferential sectors is simplified by selecting a compact radial position relative to the position in which said tyre component is manufactured.

Preferably, said first diameter and third diameter are substantially identical. In this manner, a single coupling and uncoupling position for the circumferential sectors is defined.

In accordance with a possible embodiment, manufacturing said at least one component of said at least one first tyre comprises manufacturing at least one first belt layer.

In particular, manufacturing said at least one component of said at least one first tyre comprises applying a plurality of strip-like elements on said forming drum, which strip-like elements are disposed in a mutually approached relationship according to the circumferential extension of said forming drum for making at least one first belt layer.

Preferably, manufacturing said at least one component of said at least one first tyre comprises making at least one crown structure including at least one first belt layer and a tread band.

According to a possible embodiment, each circumferential sector is adapted to be removably coupled to said central body by activating at least one reversible quick-fit device.

Preferably, each circumferential sector is adapted to be uncoupled from the central body by deactivating at least one reversible quick-fit device. The presence of a reversible quick-fit device helps in reducing the time for replacement of the circular sectors and in simplifying carrying out of this operation.

According to a possible embodiment, each circumferential sector is adapted to be removably coupled to said central body or uncoupled from said central body by activating or respectively deactivating at least one reversible quick-fit device for each circumferential sector. This solution helps in making uniform each sector of the drum and therefore the operations to be carried out for coupling or uncoupling it to and from the central body.

Preferably, the same reversible quick-fit device is adapted to selectively couple and uncouple a circumferential sector of the first series to and from the central body and a circumferential sector of the second series to and from the same central body. This helps in optimising the number and type of components of the apparatus.

Preferably, the reversible quick-fit device is adapted to be activated for coupling a circumferential sector to said central body by moving said circumferential sector and central body in a radial direction towards and close to each other.

According to a possible embodiment, the reversible quick-fit device is a snap-fit device. In this way, replacement of the circumferential sectors is simplified.

Preferably, at least one release element is adapted to be relatively moved, in a radial direction, close to said circumferential sector coupled to said central body so as to deactivate said snap-fit device and uncouple the circumferential sector from said central body.

Preferably, provision is made for a snap-fit device for each circumferential sector.

In accordance with a possible embodiment, a snap-fit device comprises at least two portions distributed along an axial direction of said central body. In this manner, this helps in stabilising coupling between the circumferential sector and the central body.

Preferably, at least one portion of the snap-fit device is disposed at an end portion of a circumferential sector in a coupled configuration with the central body. Thus possible overhanging stretches of a circumferential sector are advantageously limited.

In accordance with a possible embodiment, the snap-fit device comprises at least one movable hooking element adapted to take at least one active position at which said snap-fit element is activated and a passive position at which said snap-fit element is deactivated. Thus coupling of the circumferential sectors is made particularly efficient and replacement of same is simplified.

Preferably, said movable hooking element is constantly biased to the active position. Thus the operations to be carried out in coupling and replacing the circumferential sectors are simplified.

In accordance with a possible embodiment, said movable hooking element is adapted to move in a substantially axial direction of the central body. Thus an efficient constraint to the radial forces to which the circular sectors are submitted is provided.

In a further embodiment, said movable hooking element is associated with the central body. As a result, the number of components of the apparatus is limited.

According to a possible embodiment, the snap-fit device comprises at least one fixed hooking element including a housing seat adapted to receive said movable hooking element in the active position of the movable hooking element itself. Coupling of the circumferential sectors is therefore made particularly efficient and replacement of same is simplified.

Preferably, the fixed hooking element comprises at least one ramp adapted to interact with the movable hooking element to produce displacement thereof from the active position to the passive position and cause introduction of same into said housing seat, activating said snap-fit device. Coupling is therefore simplified as it is sufficient to move a circumferential sector close to the central body.

In accordance with a possible embodiment, said snap-fit device comprises at least one release element.

Preferably, said fixed hooking element comprises a slide seat for said release element, said slide seat being in communication with said housing seat.

Preferably, said movable hooking element is adapted to end in said slide seat in the active position of the movable hooking element itself. This represents a help in simplifying the uncoupling operation, due to the guide supplied by the slide seat.

Preferably, said movable hooking element and/or at least one portion of a confining wall of the housing seat comprises a shaped outline adapted to allow relative moving apart of a circumferential sector associated with the release element relative to the central body. This represents a help in limiting the operations required during the step of replacing the circumferential sectors.

According to a possible embodiment, said fixed hooking element is associated with a circumferential sector. Thus the number of components of the apparatus is advantageously limited.

Further features and advantages will become more apparent from the detailed description of a preferred but not exclusive embodiment of a method and an apparatus for building a sequence of tyres different from each other, according to the present invention.

BRIEF DESCRIPTION THE DRAWINGS

Figure 2:
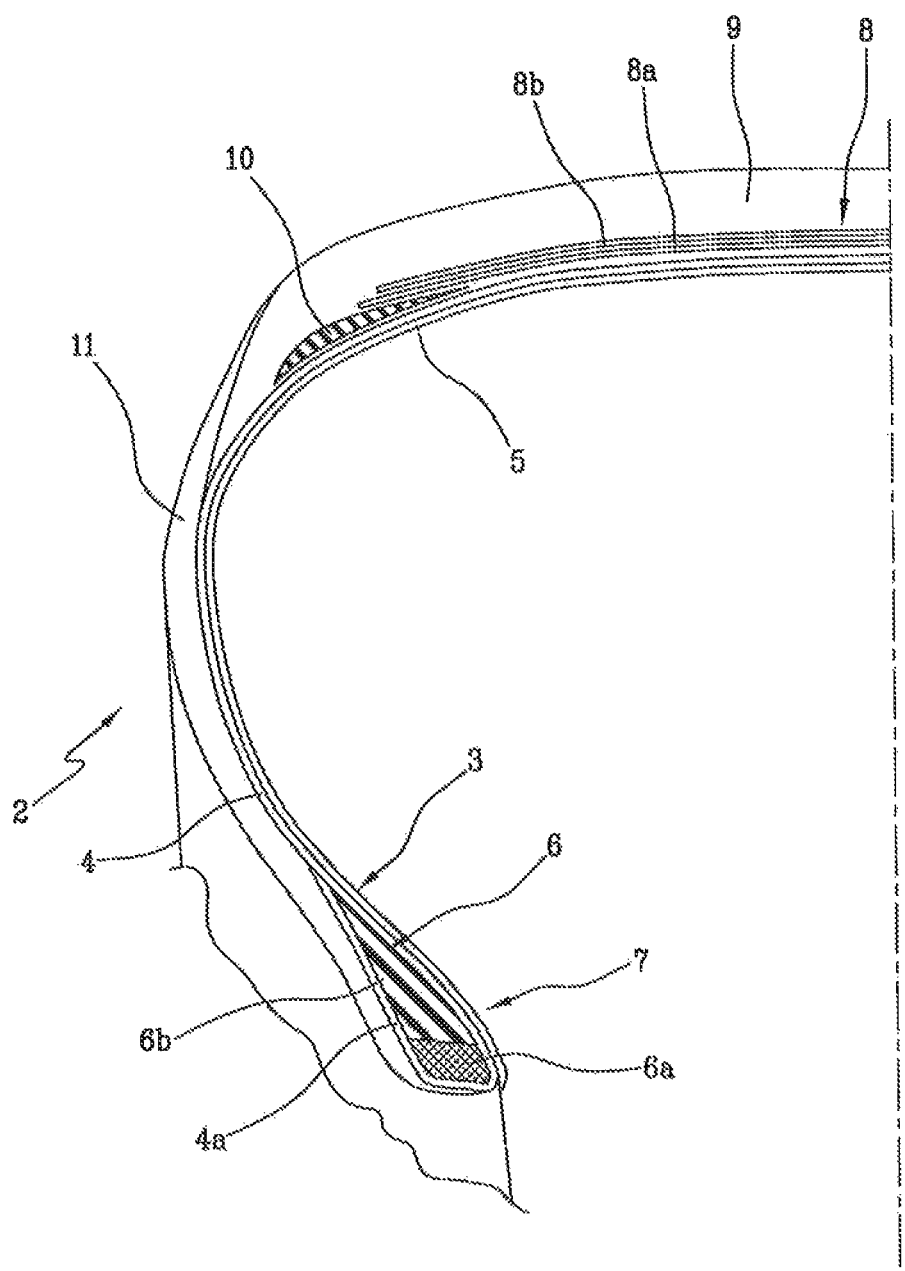
Figure 3:
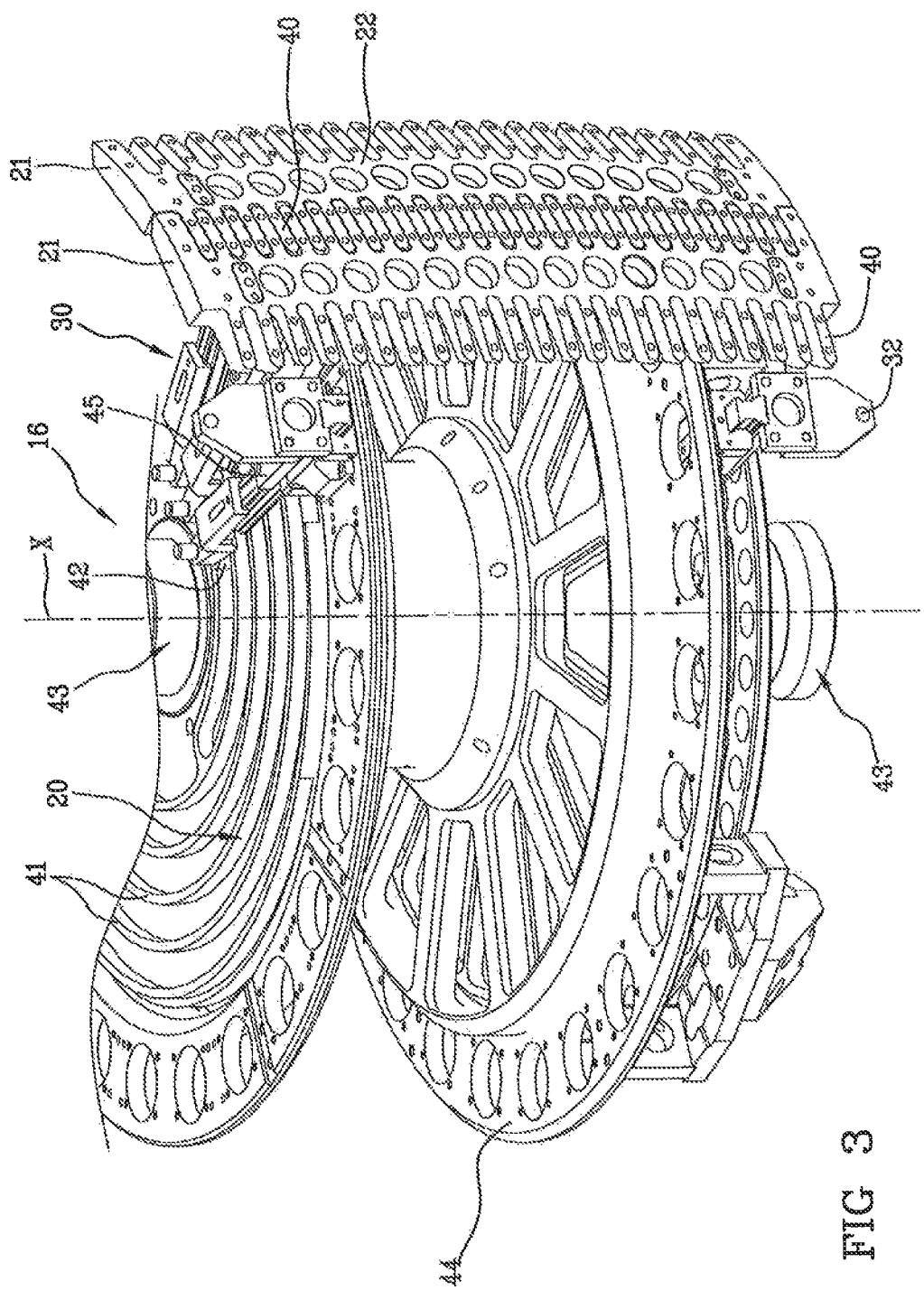
Figure 4:
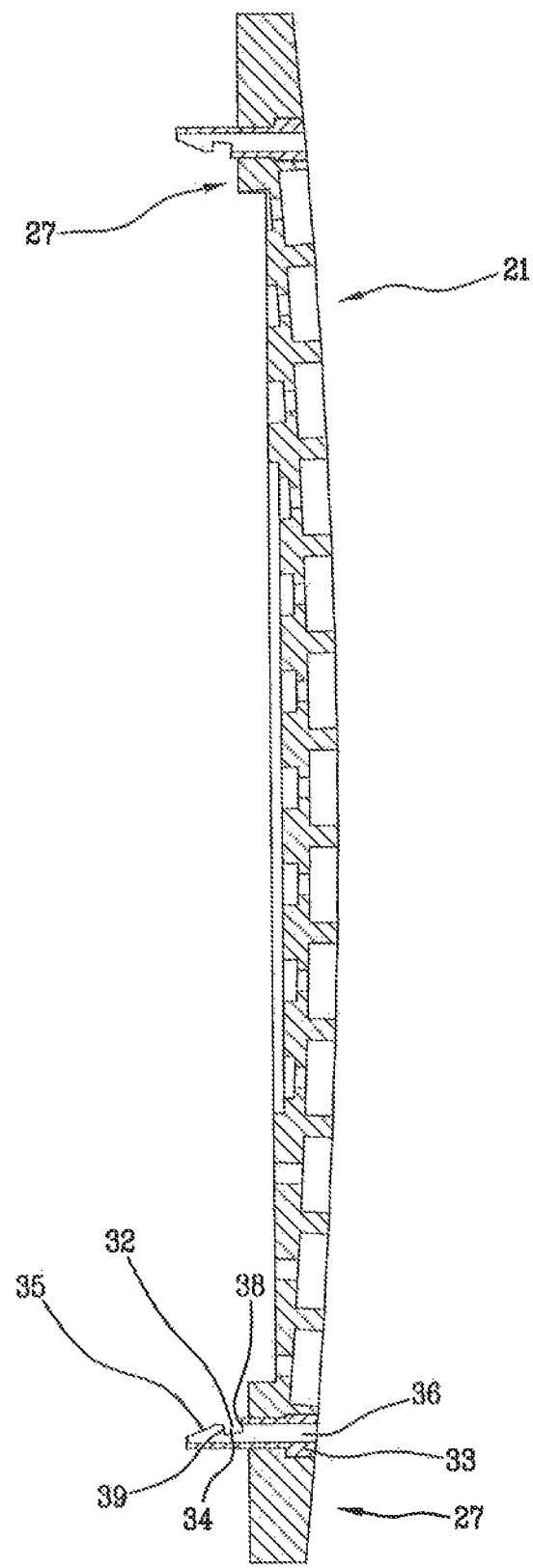
Figure 5:
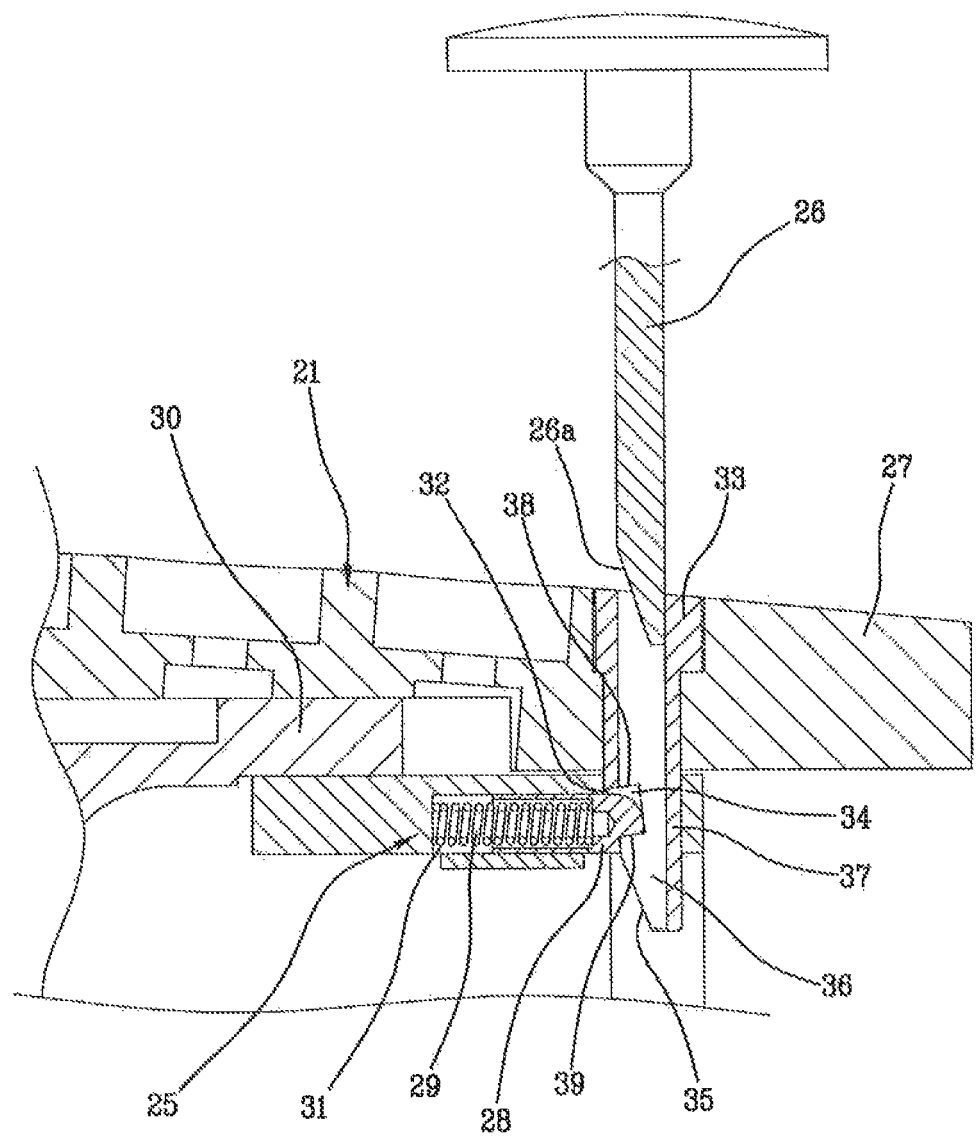
Figure 6:
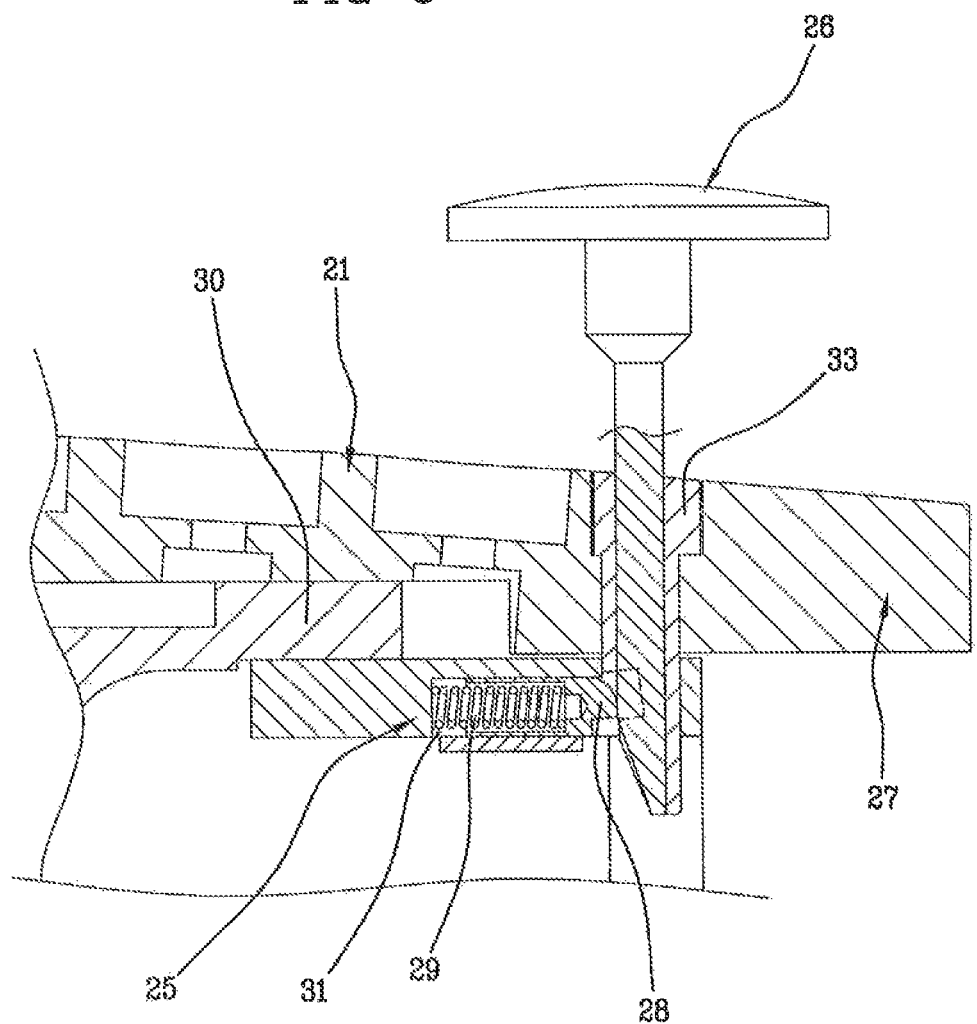

This description will be set out hereinafter with reference to the accompanying drawings, given by way of non-limiting example, in which:

FIG. 1 diagrammatically shows a top view of an apparatus for building a sequence of tyres different from each other, made in accordance with the present invention;

FIG. 2 diagrammatically shows a fragmentary diametrical section view of a tyre that can be manufactured by the method and apparatus being the object of the present invention;

FIG. 3 is a diagrammatic perspective view partly interrupted of a forming drum that is part of the apparatus being the object of the present invention;

FIG. 4 diagrammatically shows a diametrical section of a portion of the forming drum corresponding to a circumferential sector associated with a portion of a central body;

FIGS. 5 and 6 diagrammatically show a diametrical section of a portion of the forming drum in a first and second operating conditions, respectively.

DETAILED DESCRIPTION OF THE INVENTION

With reference to the drawings, generally denoted at 1 is an apparatus for building a sequence of tyres different from each other, designed to put into practice a method according to the present invention.

Apparatus 1 is designed to manufacture tyres 2 (FIG. 2) essentially comprising a carcass structure 3 having at least one carcass ply 4 and a crown structure associated with said carcass structure 3 at a radially external position.

A layer of airtight elastomeric material or a so-called liner 5 can be applied internally of the carcass ply/plies 4. Two annular anchoring structures 6 each including a so-called bead core 6a carrying an elastomeric filler 6b at a radially external position are in engagement with respective end flaps 4a of the carcass ply/plies 4. The annular anchoring structures 6 are integrated in the vicinity of regions usually identified as "beads" 7, at which usually engagement between tyre 2 and a respective mounting rim takes place.

Preferably, the crown structure comprises at least one belt structure having a belt layer or strip. More preferably, the crown structure comprises a belt structure having at least one belt layer or strip and a tread band.

In the example shown in FIG. 2, a belt structure 8 comprising two belt layers 8a, 8b is circumferentially applied around the carcass ply/plies 4. A tread band 9 is circumferentially superposed on said belt structure 8.

So-called "under-belt inserts" 10 can be associated with the belt structure 8 being each disposed between the carcass ply/plies 4 and one of the axially opposite end edges of the belt structure 8. In addition or as an alternative to the under-belt inserts 10, annular inserts of elastomeric material and/or comprising cords or other reinforcing elements can be radially superposed at least on the axially opposite end edges of the belt structure 8, and/or interposed between the belt layers 8a, 8b, at least at said end edges.

Two sidewalls 11, extending each from the corresponding bead 7 to a corresponding side edge of the tread band 9, are applied to the carcass ply/plies 4 at laterally opposite positions.

In building the carcass structure and crown structure, respective forming drums are used that are defined as primary drum and respectively auxiliary drum, for example.

Generally, a forming drum can externally have a deposition surface of substantially cylindrical conformation, made up of a plurality of circumferential sectors consecutively disposed around a geometric symmetry axis of the forming drum. These elements will be described below with reference to FIG. 3 and the following figures related to an auxiliary drum.

To the aims of the present invention by the expression "substantially cylindrical" drum it is intended a drum corresponding to a solid of revolution defined by a generatrix having rectilinear extension or arched outline.

With reference to FIG. 1, apparatus 1 comprises a carcass-building station, generally identified with reference numeral 12, for example.

In the carcass-building station 12 the carcass ply/plies 4 can be made starting from a manufactured article in the form of a continuous strip, consisting of cords of textile or metallic material, disposed parallel to each other in a matrix of elastomeric material. Preferably said carcass ply/plies 4 are made by deposition on a forming drum, in particular a so-called primary drum, not shown, of a plurality of strip-like elements disposed in mutually adjacent relationship according to the circumferential extension of the forming drum.

In the carcass-building station the primary drum can be operatively supported by at least one chuck, a robotized arm, or other device enabling said drum to be driven in rotation, if necessary, and/or to be suitably moved during application of the components of the carcass structure 3.

More particularly, the primary drum is adapted to first receive liner 5, if any, preferably made by spiraling of a continuous elongated element of elastomeric material, and subsequently the carcass ply/plies 4 so as to form a cylindrical sleeve on the opposite end flaps of which the annular anchoring structures 6 are subsequently fitted. Turning-up of the end flaps 4a of the carcass ply/plies 4 around the annular anchoring structures 6 can be subsequently carried out. Application of the sidewalls 11 on the primary drum can be further provided, preferably by spiraling of a continuous elongated element thereon, which operation is preferably carried out after application of the carcass ply/plies 4.

The primary drum with which the carcass structure 3 made in the form of a cylindrical sleeve is associated can be transferred by a first transfer member 13 to an assembling and shaping station 14.

With reference to FIG. 1, apparatus 1 further comprises a crown-structure building station generally denoted at 15, for example.

Each of the belt layers 8a, 8b of the crown structure can be made by winding a segment obtained from a semimanufactured product in the form of a continuous strip on a forming drum (in particular, a so-called auxiliary drum 16, illustrated in more detail in FIG. 3 and in the following figures). Preferably, each belt layer is made by deposition of a plurality of strip-like elements on said auxiliary drum 16, which strip-like elements are disposed in mutually approached relationship according to the circumferential extension of the auxiliary drum 16.

For completing said crown structure, a tread band 9 is preferably made on said belt layers thus formed on the auxiliary drum 16, by spiraling of at least one continuous elongated element of elastomeric material at a radially external position relative to said belt layers. The crown structure thus formed is subsequently picked up from the auxiliary drum 16 to be coupled to the carcass structure 3 preferably disposed on the primary drum inside the assembling and shaping station 14.

Alternatively or in association with application of the same on the primary drum, the tyre sidewalls 11 can be made in the continuation of the axially opposite edges of the tread band 9. Preferably this operation takes place by spiraling at least one continuous elongated element of elastomeric material on the auxiliary drum 16 carrying the crown structure being formed.

A second transfer member 17 movable between the crown-structure building station 15 (in particular the auxiliary drum 16) and the assembling and shaping station 14 carries out transfer of the crown structure onto the carcass structure 3 preferably supported by the primary drum.

When the crown structure is in a centred position relative to the carcass structure 3, the carcass structure 3 is shaped into a toroidal configuration, in a manner known by itself. The consequent radial expansion of the carcass ply/plies 4 makes the latter adhere against the inner surface of the crown structure.

Tyre 2 thus built is adapted to be removed from the assembling and shaping station 14 by a third transfer member 18 for example, to be submitted to a curing and moulding treatment in a curing and moulding station 19, and/or to other working operations provided in the work cycle.

According to an embodiment of the present invention, shown in FIG. 3 for example, apparatus 1 for building a sequence of tyres different from each other comprises at least one central body 20 of a forming drum, in particular an auxiliary drum, and at least one first series of circumferential sectors 21. A circumferential sector 21 of the first series is adapted to be removably coupled to the central body 20 for generating a first deposition surface 22. Apparatus 1 further comprises at least one second series of circumferential sectors, herein not shown but similar to the sectors of the first series, in which a circumferential sector of the second series is adapted to be removably coupled to the central body 20 so as to generate a second deposition surface different from the first deposition surface.

The following description related to each circumferential sector 21 of the first series, in particular with reference to the conformation of the reversible quick-fit device, is also valid for the circumferential sectors of other series, in particular for the circumferential sectors of the second series.

FIG. 3 and the following ones are hereinafter described with reference to the first series of circumferential sectors 21.

The first deposition surface is selected as a function of the type of a first tyre to be built and the second deposition surface is selected as a function of the type of a second tyre to be built that is different from the first tyre.

Hereinafter the invention will be described with reference to manufacture of the crown structure, in which the forming drum is the auxiliary drum 16. In FIG. 3 a geometric symmetry axis of the auxiliary drum 16 defining an axial direction has been denoted by "X".

A sector-changing station 23 is preferably interlocked with the crown-structure building station 15 for providing the forming drum, in particular the auxiliary drum 16 provided with the deposition surface suitable for the type of tyre being built. A fourth transfer member 24 removes the auxiliary drum from the sector-changing station 23 and transfers it to the crown-structure building station 15.

The sector-changing station 23 comprises at least one central body 20 and at least two series of circumferential sectors; in particular as many series of circumferential sectors as the types of tyres to be built can be provided.

In accordance with the method of the invention, inside the sector-changing station 23 shown in FIG. 1 the first deposition surface 22 can be generated by the first series of consecutive circumferential sectors 21.

In particular each circumferential sector 21 of the first series is removably coupled to the central body of the auxiliary drum 16 thus generating the first deposition surface 22.

The auxiliary drum 16 is then transferred to the crown-structure building station 15 so as to make at least one component of the first tyre by deposition of such a component on the first deposition surface 22. With reference to the example shown, the auxiliary drum 16 is transferred to the crown-structure building station 15 for making a crown structure.

Preferably said at least one component of the first tyre is obtained by applying a plurality of strip-like elements at a radially external position to the first deposition surface 22 of the auxiliary drum, which strip-like elements are disposed in mutually approached relationship according to the circumferential extension of the auxiliary drum 16 so as to make a first belt layer, for example.

The crown structure, when building of same has been completed, is removed from the auxiliary drum and transferred to the assembling and shaping station 14 for example, as previously described.

On passing from building of the first type of tyre to building of the second type of tyre that is different from the first one, the auxiliary drum 16 is transferred to the sector-changing station 23 before being transferred again to the building station of the crown structure 15, for replacing each circumferential sector 21 of the first series with a circumferential sector of the second series so as to generate the second deposition surface selected as a function of the type of the second tyre to be built that is different from the first tyre.

Replacement of the circumferential sectors contemplates uncoupling of each circumferential sector 21 of the first series from the central body 20 and removable coupling of each circumferential sector of the second series to the same central body 20.

With reference to the method of building a sequence of tyres different from each other, replacement of each circumferential sector 21 of the first series with a circumferential sector of the second series contemplates uncoupling of each circumferential sector 21 of the first series from the central body 20 by deactivating at least one reversible quick-fit device 25. In particular, replacement of each circumferential sector 21 of the first series with a circumferential sector of the second series contemplates uncoupling of each circumferential sector 21 of the first series from the central body 20 by deactivating at least one reversible quick-fit device for each circumferential sector.

In addition, replacement of each circumferential sector 21 of the first series with a circumferential sector of the second series comprises coupling each circumferential sector of the second series to the central body 20 by activating the reversible quick-fit device 25. In particular replacement of each circumferential sector 21 of the first series with a circumferential sector of the second series comprises coupling each circumferential sector of the second series to the central body 20 by activating at least one reversible quick-fit device 25 for each circumferential sector.

With reference to the example shown in the figures, the same reversible quick-fit device 25 is suitable for selectively coupling and uncoupling a circumferential sector 21 of the first series to and from the central body 20 and a circumferential sector of the second series to and from the same central body 20.

With reference for example to FIG. 3 and the following figures, the reversible quick-fit device 25 is activated for coupling a circumferential sector to the central body 20 by relatively moving the circumferential sector close to the central body 20 in a radial direction. In the example shown, each circumferential sector is radially moved close to the central body. In addition, the reversible quick-fit device 25 is deactivated for uncoupling a circumferential sector from the central body 20 by relatively moving a release element 26 in a radial direction close to said circumferential sector coupled to said central body 20.

With reference for example to FIG. 3 and the following figures, the reversible quick-fit device 25 is a snap-fit device. In accordance with the preceding description, at least one release element 26 (FIG. 6) is adapted to be relatively moved close in the radial direction to the circumferential sector coupled to the central body for deactivating the snap-fit device and uncoupling the circumferential sector from the central body.

In particular, according to the example shown, the auxiliary drum 16 belonging to apparatus 1 comprises a snap-fit device for each circumferential sector.

With reference to FIG. 3 and the following figures, the snap-fit device comprises at least two portions 27 distributed along an axial direction of the central body 20. In particular at least one portion 27 of the snap-fit device is disposed at an end portion of a circumferential sector in the configuration coupled to the central body. In the example shown the two portions 27 of the snap-fit device are disposed at opposite end portions respectively of the circumferential sector in the configuration coupled to the central body.

FIGS. 5-6 show a portion 27 of the snap-fit device comprising at least one movable hooking element 28 adapted to take at least one active position (FIG. 5) at which the snap-fit device is activated and a passive position at which the snap-fit devices is deactivated (FIG. 6). Preferably, the movable hooking element 28 is constantly pushed to the active position by at least one spring element 29, for example.

According to the example shown, the movable hooking element 28 is adapted to move in a substantially axial direction of the central body. This direction is parallel to the geometric axis X.

Advantageously, the movable hooking element 28 is associated with the central body 20. In particular, denoted at 30 is an arm of the central body 20 on which a circumferential sector is mounted, said arm 30 comprising a seat 31 in which the movable hooking element 28 is housed. Seat 31 preferably extends along the axial direction defining the direction along which the movable hooking element 28 moves.

Denoted at 32 is an opening formed in the arm 30 of the central body 20 for receiving a fixed hooking element 33 to be described in detail in the following. Opening 32 is a through opening for example and it extends in a radial direction of the central body 20. The opening 32 and seat 31 mutually intersect at a free end of the movable hooking element 28.

FIGS. 5-6 show a portion 27 of the snap-fit device further comprising at least one fixed hooking element 33 associated with a circumferential sector, for example. In particular, the fixed hooking element 33 has a pin structure extending in the radial direction from a radially internal surface of the circumferential sector. By the term "radially internal surface" it is intended a surface facing the central body in the assembled configuration of the auxiliary drum.

The fixed hooking element 33 is adapted to be received in the opening 32 of arm 30 and comprises a housing seat 34 adapted to receive the movable hooking element 28 in the active position of the movable hooking element itself.

With reference to FIGS. 5-6, the fixed hooking element 33 comprises at least one ramp 35 adapted to interact with the movable hooking element 28 to cause shifting of same from the active position to the passive position and produce fitting thereof into the housing seat 34 activating the snap-fit device. FIG. 5 shows a portion of the circumferential sector and the central body corresponding to the snap-fit device, in which the fixed hooking element 33 is inserted in the opening 32 and the movable hooking element 28 is inserted in the housing seat 34.

As shown in the figures, the snap-fit device comprises at least one release element 26 preferably provided with a ramp 26a for interacting with the movable hooking element 28. In particular, the fixed hooking element 33 comprises a slide seat 36 for the release element 26. The slide seat 36 is in communication with the housing seat 34, and the movable hooking element 28 is adapted to end into the slide seat 36 in the active position of the movable hooking element itself. In particular, the slide seat 36 extends along a radial direction of the central body forming a preferably cylindrical and internally hollow side wall 37. The housing seat 34 is obtained through an opening of the side wall 37 being confined by a bounding wall 38. The bounding wall 38 further forms a constraint against which the movable hooking element in the active position abuts, for locking the circumferential sector on the central body.

In accordance with the embodiment shown, the movable hooking element 28 and/or at least one portion of the bounding wall 38 of the housing seat 34 comprises a shaped outline 39 adapted to enable relative moving apart of a circumferential sector associated with the release element 26 relative to the central body 20 when the release element 26 is inserted in the slide seat 36.

As previously said, FIGS. 5-6 show a portion 27 of the snap-fit device. Preferably the other portion is a mirror image relative to a median plane perpendicular to the symmetry axis X. In particular, each circumferential sector is carried by at least one or, as shown in FIG. 3, a pair of radial arms 30 placed in the vicinity of respective axially opposite sides of the auxiliary drum. Arms 30 are operatively in engagement with radial-positioning adjusting devices for the sectors themselves, not described in detail. These adjusting devices are adapted to simultaneously cause translation of the circumferential sectors in a direction radial to the geometric axis X of the auxiliary drum 16, so as to give rise to a variation in the diametrical sizes of the drum itself, starting from a minimum diameter at which the circumferential sectors can, for example, mutually act in abutment by means of respective circumferential shoulders they are provided with at the deposition surface, so as to give the same a continuous course.

The circumferential shoulders of each circumferential sector are preferably defined at respective comb-shaped end portions 40 each of which is operatively in engagement with a mating comb-shaped end portion 40 carried by a circumferentially adjacent circumferential sector. In this way, the deposition surface advantageously keeps its substantially cylindrical conformation and a substantially continuous extension, i.e. without important discontinuities, also following a radial expansion of the forming drum upon the action of the adjusting devices.

The adjusting devices preferably comprise at least one or, as shown in FIG. 3, a pair of spiral-shaped cams 41 operatively engaging the circumferential sectors, at respective sliders 42 carried each by one of arms 30. The spiral-shaped cams 41 each engage the sliders 42 of arms 30 disposed on the same side of the auxiliary drum 16 and are fastened to a grip shank 43 coaxial with the geometric axis X and drivable in rotation by a handling device that can be removably connected to the drum.

At least one or, as shown, a pair of guide flanges 44 support the circumferential sectors radially guiding them relative to the geometric axis X by means of guide seats 45 slidably crossed by the respective radial arms 30. The guide flanges 44 are rotatably supported by the grip shank 43 through bearings.

Preferably, at least one robotized arm is suitable to operatively engage the grip shank 43 for conveniently supporting and moving the auxiliary drum 16 in the sector-changing station 23 and the crown-structure building station 15.

In particular, provision is made for modifying the radial position of the circumferential sectors coupled to the central body before manufacturing the first component of the crown structure of the tyre being processed. To this aim, the robotized arm operates on the adjusting devices as previously described, for example. In greater detail, the radial position of the circumferential sectors 21 coupled to the central body 20 is modified through translation of the circumferential sectors 21 from a first diameter in which the first deposition surface is generated to a second diameter greater than the first diameter. Preferably, the auxiliary drum 16 set to the second diameter is adapted to manufacture a first component of the crown structure of the tyre being processed, a pair of under-belt inserts or at least one belt layer, for example.

In addition, provision is made for modifying the radial position of the circumferential sectors 21 coupled to the central body 20 before replacing each circumferential sector 21 of the first series with a circumferential sector of the second series. In this case, when the crown structure has been made by deposition carried out on the deposition surface of the auxiliary drum at the second diameter, the radial position of the circumferential sectors 21 coupled to the central body 20 is subsequently modified before replacing each circumferential sector 21 of the first series with a circumferential sector of the second series. In particular, the circumferential sectors 21 of the first series are submitted to translation from the second diameter to a third diameter smaller than the second diameter.

Preferably, the first diameter and third diameter are substantially identical. In other words, mounting and dismantling of the circumferential sectors takes place in correspondence of the same diameter of the auxiliary drum 16.

The above described apparatus and method refer to a crown-structure building station 15 with reference to the fact that the manufactured crown structure also comprises the tread band. Alternatively, the crown-structure building station 15 can be replaced with a building station concerning one or more belt layers, should the tread band be manufactured subsequently.

In the example shown, two different transfer members have been provided which operate between the crown-structure building station 15 and the assembling and shaping station 14 and between the sector-changing station 23 and the crown-structure building station 15. Alternatively, a single transfer member can perform both functions.

The invention claimed is:

1. A method of building a sequence of tyres different from each other, comprising:
    generating a first deposition surface by a first series of consecutive circumferential sectors, said first deposition surface being selected as a function of a type of a first tyre to be built; each circumferential sector of the first series being removably coupled to a central body of a forming drum;
    manufacturing at least one component of said first tyre by deposition of said at least one component at a radially external position to said first deposition surface of the forming drum;
    removing said at least one component from the forming drum; and
    replacing each circumferential sector of the first series with a circumferential sector of a second series for generating a second deposition surface selected as a function of a type of a second tyre to be built which is different from said first tyre;
    wherein said replacing comprises translating each circumferential sector of the first series radially inward to an inner diameter position, and while each circumferential sector is positioned at the inner diameter position, uncoupling each circumferential sector of the first series from the central body, and at the inner diameter position, removably coupling each circumferential sector of the second series to a same central body.

2. The method as claimed in claim 1, wherein each circumferential sector is removably coupled to said central body by activating at least one reversible quick-fit device.

3. The method as claimed in claim 2, wherein said reversible quick-fit device is a snap-fit device.

4. The method as claimed in claim 3, wherein said replacing of each circumferential sector of the first series with a circumferential sector of the second series comprises deactivating and activating a same snap-fit device for each circumferential sector.

5. The method as claimed in claim 2, wherein the reversible quick-fit device is activated for coupling a circumferential sector to said central body by relatively moving said circumferential sector close to said central body in a radial direction.

6. The method as claimed in claim 2, wherein the reversible quick-fit device is deactivated for uncoupling a circumferential sector from said central body by relatively moving a release element in a radial direction close to said circumferential sector coupled to said central body.

7. The method as claimed in claim 1, wherein said replacing of each circumferential sector of the first series with a circumferential sector of the second series comprises uncoupling each circumferential sector of the first series from the central body by deactivating at least one reversible quick-fit device.

8. The method as claimed in claim 7, wherein said replacing of each circumferential sector of the first series with a circumferential sector of the second series comprises coupling each circumferential sector of the second series to the central body by activating said at least one reversible quick-fit device.

9. The method as claimed in claim 7, wherein said replacing of each circumferential sector of the first series with a circumferential sector of the second series comprises coupling each circumferential sector of the second series to the central body by activating said at least one reversible quick-fit device for each circumferential sector.

10. The method as claimed in claim 1, wherein said replacing of each circumferential sector of the first series with a circumferential sector of the second series comprises uncoupling each circumferential sector of the first series from the central body by deactivating at least one reversible quick-fit device for each circumferential sector.

11. The method as claimed in claim 1, comprising:
    modifying the radial position of the circumferential sectors coupled to the central body before manufacturing at least one component of said first tyre.

12. The method as claimed in claim 11, wherein modifying the radial position of the circumferential sectors coupled to the central body comprises translating the circumferential sectors from a first diameter in which said first deposition surface is generated to a second diameter greater than said first diameter.

13. The method as claimed in claim 12, wherein:
    manufacturing said at least one component of said first tyre by deposition of said at least one component at a position radially external to said first deposition surface of the forming drum is carried out in correspondence with said second diameter.

14. The method as claimed in claim 1, wherein
the inner diameter is smaller than said second diameter.

15. The method as claimed in claim 14, wherein said first diameter and the inner diameter are substantially identical.

16. The method as claimed in claim 1, wherein:
manufacturing said at least one component of said first tyre comprises manufacturing at least one first belt layer.

17. The method as claimed in claim 1, wherein:
manufacturing said at least one component of said first tyre comprises applying a plurality of strip-like elements on said forming drum, said strip-like elements being disposed in a mutually approached relationship according to the circumferential extension of said forming drum for making at least one first belt layer.

18. The method as claimed in claim 1, wherein:
manufacturing said at least one component of said first tyre comprises making at least one crown structure comprising at least one first belt layer and a tread band.

19. An apparatus for building a sequence of tyres different from each other, comprising:
at least one central body of a forming drum;
at least one first series of circumferential sectors in which each circumferential sector of said first series is adapted to be removably coupled to said central body so as to generate a first deposition surface; and
at least one second series of circumferential sectors in which each circumferential sector of said second series is adapted to be removably coupled to said central body so as to generate a second deposition surface;
wherein said first deposition surface is selected as a function of a type of a first tyre to be bunt and said second deposition surface is selected as a function of a type of a second tyre to be bunt which is different from said first tyre;
wherein each circumferential sector of the first series is radially translatable between an inner diameter position and an outer diameter position, and further adapted to be uncoupled from the central body at the inner diameter position; and
wherein each circumferential sector of the second series is further adapted to be coupled to the central body at the inner diameter position.

20. The apparatus as claimed in claim 19, wherein each circumferential sector is adapted to be removably coupled to said central body by activating at least one reversible quick-fit device.

21. The apparatus as claimed in claim 20, wherein a same reversible quick-fit device is adapted to selectively couple and uncouple a circumferential sector of the first series to and from the central body and a circumferential sector of the second series to and from a same central body.

22. The apparatus as claimed in claim 20, wherein the reversible quick-fit device is adapted to be activated for coupling a circumferential sector to said central body, by relatively moving in a radial direction, said circumferential sector and central body close to each other.

23. The apparatus as claimed in claim 19, wherein each circumferential sector is adapted to be uncoupled from the central body by deactivating at least one reversible quick-fit device.

24. The apparatus as claimed in claim 19, wherein each circumferential sector is adapted to be removably coupled to said central body or uncoupled from the central body by activating or respectively deactivating at least one reversible quick-fit device for each circumferential sector.

25. The apparatus as claimed in claim 20, wherein said reversible quick-fit device is a snap-fit device.

26. The apparatus as claimed in claim 25, comprising at least one release element adapted to be relatively moved, in a radial direction, close to said circumferential sector coupled to said central body so as to deactivate said snap-fit device and uncouple the circumferential sector from said central body.

27. The apparatus as claimed in claim 25, comprising a snap-fit device for each circumferential sector.

28. The apparatus as claimed claim 25, wherein said snap-fit device comprises at least two portions distributed along an axial direction of said central body.

29. The apparatus as claimed in claim 28, wherein at least one portion of the snap-fit device is disposed at an end portion of a circumferential sector in a coupled configuration with the central body.

30. The apparatus as claimed in claim 25, wherein the snap-fit device comprises at least one movable hooking element adapted to take at least one active position at which said snap-fit element is activated and a passive position at which said snap-fit element is deactivated.

31. The apparatus as claimed in claim 30, wherein said movable hooking element is constantly biased to an active position.

32. The apparatus as claimed in claim 30, wherein said movable hooking element is adapted to move according to a substantially axial direction of the central body.

33. The apparatus as claimed in claim 30, wherein said movable hooking element is associated with the central body.

34. The apparatus as claimed in claim 30, wherein the snap-fit device comprises at least one fixed hooking element comprising a housing seat adapted to receive said movable hooking element in the active position of the movable hooking element.

35. The apparatus as claimed in claim 34, wherein said movable hooking element and/or at least one portion of a confining wall of the housing seat comprises a shaped outline adapted to allow relative moving apart of a circumferential sector associated with the release element relative to the central body.

36. The apparatus as claimed in claim 34, wherein said fixed hooking element is associated with a circumferential sector.

37. The apparatus as claimed in claim 34, wherein said fixed hooking element comprises at least one ramp adapted to interact with the movable hooking element to produce shifting thereof from the active position to the passive position and cause introduction thereof into said housing seat, thereby activating said snap-fit device.

38. The apparatus as claimed in claim 25, wherein said snap-fit device comprises at least one release element.

39. The apparatus as claimed in claim 38, wherein the snap-fit device comprises at least one fixed hooking element comprising a housing seat adapted to receive said movable hooking element in the active position of the movable hooking element, and wherein said fixed hooking element comprises a slide seat for said release element, said slide seat being in communication with said housing seat.

40. The apparatus as claimed in claim 39, wherein said movable hooking element is adapted to end in said slide seat in the active position of the movable hooking element.

* * * * *